United States Patent [19]

Jensen

[11] 3,959,797

[45] May 25, 1976

[54] INK JET PRINTER APPARATUS AND METHOD OF PRINTING

[75] Inventor: Donald F. Jensen, Endicott, N.Y.

[73] Assignee: International Business Machines Corporation, Armonk, N.Y.

[22] Filed: Dec. 16, 1974

[21] Appl. No.: 533,414

[52] U.S. Cl. .......... 346/1; 346/75

[51] Int. Cl.$^2$ .......... G01D 15/18

[58] Field of Search .......... 346/75, 1, 140

[56] References Cited

UNITED STATES PATENTS

| | | | |
|---|---|---|---|
| 3,484,794 | 12/1969 | Winston | 346/75 |
| 3,805,272 | 4/1974 | Fan et al. | 346/75 |
| 3,864,692 | 2/1975 | McDonnell et al. | 346/75 |

*Primary Examiner*—Joseph W. Hartary
*Attorney, Agent, or Firm*—J. S. Gasper

[57] ABSTRACT

An ink jet printer prints dot matrix characters by removing unwanted drops from a sequence of uniformly spaced drops in an ink jet stream and subjecting the remaining print drops to a vertical raster deflection in timed relation with relative horizontal motion of the jet stream and a record medium. Selected print drops are individually deflected fractional amounts in either the horizontal or vertical direction prior to the vertical raster deflection to cause the selected print drops to be deposited at positions intermediate the coordinate intercepts of a rectilinear matrix pattern to cause dot matrix characters to be printed with arcuate line segments and various angles corresponding with conventional character shapes.

7 Claims, 8 Drawing Figures

INK JET PRINTER APPARATUS AND METHOD OF PRINTING

BACKGROUND OF THE INVENTION

1. Field of the Invention

This invention relates to ink jet recorders and in particular to an ink jet printer in which individual drops of an ink jet are projected onto a record medium to record characters or other information in accordance with dot matrix pattern.

2. Description of the Prior Art

Ink jet recorders for printing dot matrix characters, such as alphanumerics or the like, on a print medium are well-known. Basically, such recorders operate by projecting a continuous stream of ink drops of substantially uniform size and spacing along an initial trajectory toward a print medium. The drop generation rate is substantially uniform and is dependent on the number of coordinate intercepts of the matrix field pattern and the desired speed at which characters are to be recorded on the print medium. Dot matrix characters are formed by the process of selectively intercepting certain, i.e., unwanted, drops of the stream and controllably dispersing the remaining, i.e., print, drops onto the desired coordinate matrix positions corresponding with the desired character shapes. The dispersion of the print drops to form the desired character basically depends on deflection of the drops in a first direction orthogonal to the stream trajectory concurrent with relative motion of the ink jet stream and the print medium in a second direction mutually orthogonal to the first direction and the stream trajectory. Dot matrix characters formed in accordance with this technique basically take unconventional shapes which affect print quality. This is due largely to the fact that the line segments formed by the drops are substantially straight and the available angles for printing the characters is limited. For example, the capital letter B and the numeral 8 are difficult to distinguish when the characters are formed from straight line segments of a square matrix.

Various methods have been devised to improve the print quality of dot matrix characters formed from a square matrix. One approach has been to omit dots at corner positions to give the visual suggestion of an arcuate character segment. This approach, however, destroys line continuity and reduces print quality. Another approach has been to give one or more characters unconventional shapes to distinguish it from a similar-shaped character. This, however, provides difficulty to persons not familiar with the unconventional shape. Another approach has been to deflect the stream in accordance with coordinate analog signals which essentially produce cursive line traces of characters. While this approach permits arcuate line segments to be formed, the electronics for obtaining the analog tracing is very complex and difficult to control. Another approach is to make the dots smaller and increase the matrix density. This approach, however, reduces the possible print throughput and increases the complexity for controlling the individual drops. Also, smaller drops are more susceptible to aerodynamic disturbances.

A further problem in dot matrix character printing is that solid lines composed of dots have a cusp-like edge more or less visible depending on drop size and the amount of overlap. The depth of the cusp is dependent on drop size and the degree of overlap. Also, whatever drop size is used the depth of the cusp is greater for line segments on a diagonal than for lines on the horizontal and vertical.

SUMMARY OF THE INVENTION

It is the object of this invention to provide a method and apparatus which overcomes the above problems and greatly increases the print quality of dot matrix characters utilizing ink jet drops.

It is a further object of this invention to provide an ink jet recorder apparatus which provides high quality printing without sacrificing printing rate.

It is a further object of this invention to provide an ink jet recorder for printing dot matrix characters having high print quality and conventional character shapes.

The above, as well as other objects, are obtainable in accordance with this invention by providing auxiliary deflection to selected print drops in the ink jet stream, said deflection being a fractional increment of the deflection normally required for a drop to be placed at the predetermined coordinate intercepts of a rectilinear matrix. In the preferred embodiment this invention is practiced by selectively removing the predetermined drops in an ink jet stream from a sequence of drops which are substantially uniform in size and spacing. The sequence of drops is at least equal to the number of coordinate intercepts of a predetermined rectilinear matrix pattern. The unremoved or print drops are dispersed selectively to predetermined coordinate intercept locations and locations intermediate coordinate intercepts of the dot matrix pattern whereby characters are to be formed. Specifically, the invention is practiced by generating a sequence of substantially uniformly sized and spaced ink drops at least equal in number to the number of coordinate intercepts of a rectilinear matrix pattern, selectively removing unwanted drops from said sequence where it is desired to have blank spaces at predetermined locations of said matrix pattern, subjecting the remaining print drops to a sweep signal to deflect the print drops in a first orthogonal direction, effecting relative movement of said stream and a record medium in a second orthogonal direction, said relative motion and said sweep motion operating to disperse said print drops to predetermined coordinate matrix intercepts, and deflecting certain of said print drops an additional increment in either said first or said second orthogonal directions, whereby said certain deflected print drops are deposited at locations intermediate the coordinate intercepts of a rectilinear matrix.

In the preferred embodiment of the invention the jet stream is comprised of drops of ferrofluid ink. The unwanted drops are selected by a magnetic transducer which deflects the unwanted drops from the initial jet stream trajectory into a second trajectory toward a gutter located in a position to intercept unwanted drops before they reach the print medium. The print drops while in flight are subjected to incremental deflection by transducers which, when selectively energized in accordance with a predetermined character signal, deflect the predetermined print drops an amount which produces fractional deflection either vertically or horizontally relative to the other print drops. The print drops (and the unwanted drops, to be removed by the gutter) are deflected transverse to the direction of motion of the jet stream by a magnetic transducer which is energized cyclically by a sawtooth raster scan signal. By the combination of the relative motion of the jet stream, the incremental deflection transducers, and the deflection scanning transducer the print drops are deposited at both coordinate intercepts and between coordinate intercepts of a dot matrix to form dot matrix characters of the desired shape. In this manner dot matrix characters can be formed in which curved, as well as straight line segments, are utilized. The number of available angles for printing angular segments of the characters is greatly increased. Such characters can be formed which are provided with shapes very similar to conventional print characters. A further advantage of this invention is that printing can be obtained which is very good quality using relatively few drops to form each character and providing better line definition and quality for diagonals. Also, the size of the drops may be relatively large thereby minimizing drop trajectory errors due to aerodynamic effects and improving the quality of the line segments of the character. Since larger drops may be used, fewer drops need to be generated and greater control with simpler control elements is obtainable. Further, this invention provides for an increase in the number of printable points of a print matrix without increasing the number of drops and thereby simplifying the ink jet recorder apparatus.

The foregoing and other objects, features and advantages of the invention will be apparent from the following more particular description of a preferred embodiment of the invention, as illustrated in the accompanying drawing.

DETAILED DESCRIPTION OF THE INVENTION

Figure 1:
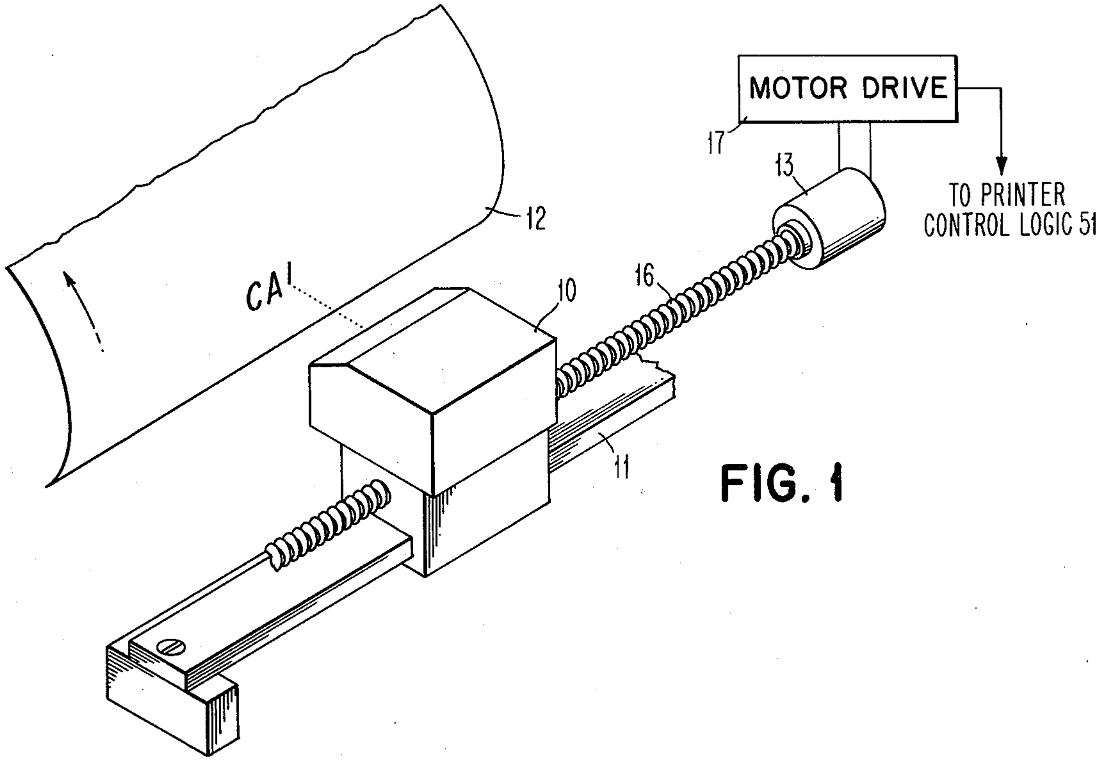
FIG. 1 is an isometric view of a general arrangement of parts forming an ink jet printer.

As seen in FIG. 1, an ink jet printer comprises a print head assembly 10 slidably mounted on a stationary horizontal guide bar 11 for reciprocating movement relative to a record medium such as a paper 12. The drive mechanism for reciprocating the print head assembly 10 comprises a reversible electric motor 13 which drives a lead screw 14 which is connected to the print head assembly 10. A motor control circuit 17 operates to control direction, acceleration, deceleration and the speed of the drive motor 13 in accordance with operational commands associated with controls which effect printing of a line of characters 18 on the paper 12. Printing may be done in either direction or in a single direction to record a line of data. In either case, at the end of each line of printing, paper 12 is advanced by means not shown and the motor drive is reactivated to move the print head assembly along the guide bar 11 and the printing cycle is initiated by external control. Various devices and controls are well-known in the art for performing the various print cycle operations. Details have been omitted to simplify the description.

For practicing this invention, the print head assembly 10 essentially comprises an ink jet print head device for producing a continuous stream of uniformly-spaced droplets which are selectively deposited onto paper 12 to form dot matrix characters. The print head assembly 10 may also include an ink supply system which could include a pump and reservoir device. Alternatively, the ink supply and pump may be separately mounted on the machine frame with the guide bar 11, in which case flexible tube connections would be required to supply ink to the print head assembly 10. Likewise, the print head assembly would include a connector device for various input electrical lines necessary for operating the ink jet head with external circuit elements to be described. Details for making the various electrical connections from the control circuits to the print head assembly are omitted since such matters are well-known in the art.

Figure 2:
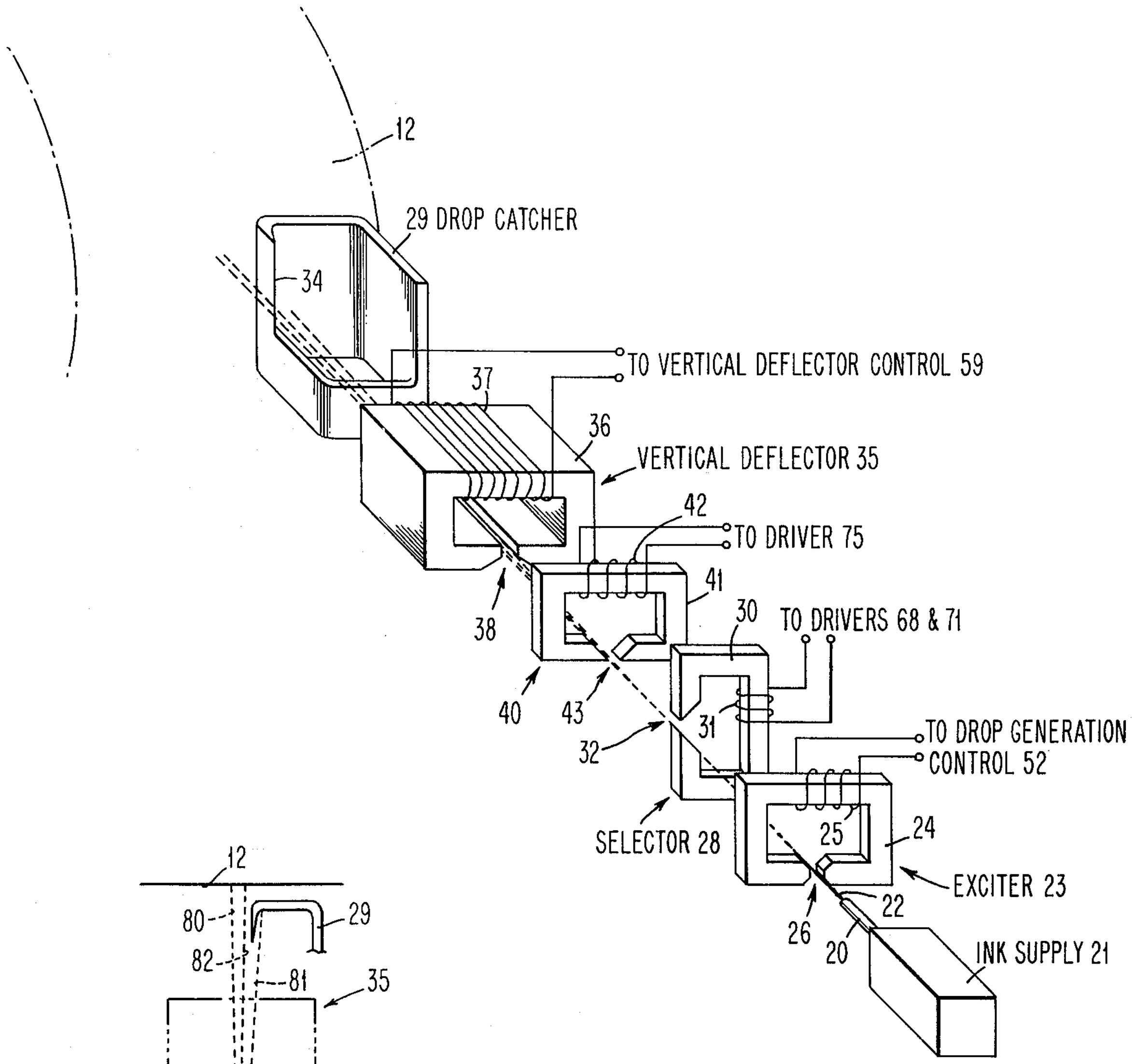
FIG. 2 is an exploded isometric view of the ink jet print head portion of the ink jet printer of FIG. 1.

In a preferred embodiment for practicing this invention the fluid ink used for printing is a ferrofluid which may be of the type described in the co-pending application of George Fan et al, entitled "Method and Apparatus for Forming Droplets from a Magnetic Liquid Stream," Ser. No. 429,414, filed Dec. 28, 1973. As seen in FIG. 2, the essential elements of the ink jet print head for practicing this invention comprises a nozzle 20 connected to an ink supply 21 which provides ferrofluid ink under constant pressure to cause a continuous jet stream of fluid ink 22 to be projected in a direction transverse to paper 12. A magnetic exciter 23 is located adjacent the jet stream near the nozzle 20. The magnetic exciter 23 comprises a magnetic core 24 and energizing coil 25. The stream 22 is directed to pass through a gap 26 in the magnetic core. A periodic signal applied to coil 25 causes variations in the magnetic field in the gap 26 to produce perturbations in the ink jet stream 22 to form a sequence uniformly-spaced drops 27 in accordance with the frequency of the energizing signal. In this manner, a continuous sequence of substantially uniform drops is generated in a straight line trajectory orthogonal to the print medium paper 12. While a single pole exciter 24 is shown, a multiple pole exciter of the type shown in the aforementioned application of G. Fan et al may be used. Electromechanical transducers which use piezoelectric crystals or magnetostrictive elements to vibrate the nozzle 21 could also be used for generating the sequence of drops 27 for the purpose of this invention.

In accordance with this invention, the various drops 27 in the jet stream 23 are either removed from the stream or dispersed in a manner to cause the print drops to become deposited on paper 12 at predetermined locations of a rectilinear dot matrix pattern. The means for selectively removing the unwanted drops 27 comprises a magnetic selector magnet 28 which when operated causes individual drops to be deflected in a horizontal direction from the initial stream trajectory and into a catcher 29 located downstream from the selector immediately in advance of the print medium 12. The selector 28 is comprised of a C-shaped magnetic core 30 and an energizing coil 31 connected to a data signal source to be described. The drops 27 are directed to pass adjacent to a gap 32 in the magnetic core 30. When selector 28 is energized, a non-uniform magnetic field is produced in the vicinity of gap 32. A drop located adjacent to the gap 32 during energization experiences a horizontal deflection force toward the gap due to the gradient of the magnetic field. Drops 27 adjacent to the gap when no magnetic field is present continue to move undeflected toward the paper in a straight line trajectory. Catcher 29 has a vertically aligned knife edge 34 aligned so that the print drops following the initial stream trajectory pass by the catcher 29 to be deposited on the paper 12. The unwanted drops deflected by selector 28 follow a second trajectory to the right of the knife edge 34, and deposit inside the catcher 29 where they collect in a pool of ink which can be returned to the ink supply 20.

Figure 3:
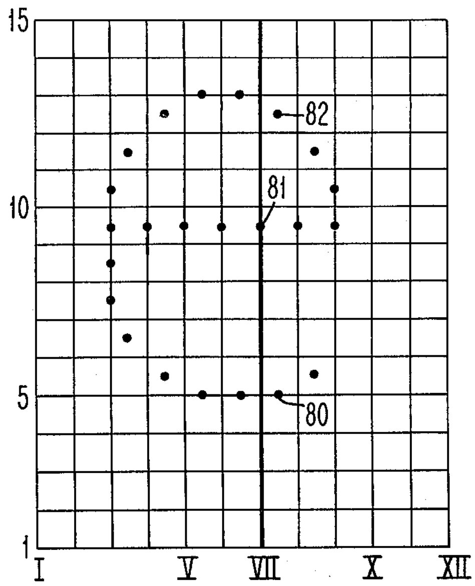
FIG. 3 shows a rectilinear matrix with a dot matrix character superimposed thereon to illustrate the manner of printing in accordance with this invention.

Located downstream from the selector 28 and in advance of the catcher 29 is vertical magnetic deflector 35 comprising a C-shaped magnetic core 36 and energizing coil 37 connected to a raster scanning signal source. The magnetic core 36 has an upwardly tapered gap 38 through which both the unwanted and print drops are directed on their way to the catcher 29 and paper 12, respectively. The tapered gap 38 produces a gradient magnetic field which is effective to impart a deflecting force in the direction of the field gradient, i.e., toward the apex of the tapered gap. The raster scan deflection signal applied to coil 37 produces a vertical dispersion of drops 27 which causes them to be deposited at predetermined locations of paper 12. The degree of vertical deflection of the droplets is dependent on the time they are within the gap 38 and the average intensity of the magnetic field gradient during that time interval. Since the intensity of the gradient is limited by saturation levels of the core material, it cannot be made arbitrarily intense. It is found that in order to achieve the required deflection for printing standard character heights that the deflector core 36 must be constructed of such a length that a plurality of drops 27 will be present in the gap simultaneously. For example, in the preferred embodiment this length is chosen to include six drops. The six drops which are present in the deflector core 36 during the reset of the sawtooth signal are then unusable for printing and are discarded by the selector 28. Hence, for each scan of 15 printable drops, 21 drops must be generated. Drops 1 through 15 are printable while drops 16 through 21 always removed by the action of the selector 28. The raster scan signal is reset when drop 21 is entering the deflector 36, at which time only drops 16 through 21 are within the deflection gap 38. Unwanted drops 27 also experience a vertical scan, but since they have been horizontally deflected from the initial trajectory by selector 32, they will not pass by the knife edge 34 of the drop catcher but will be removed from the print operation. As a result of subjecting drops 27 to the raster scanning of deflector 35 and the relative motion of the ink jet print head horizontally relative to paper 12, the print drops are deposited at specific coordinate intercept locations of a rectilinear matrix pattern to form dot matrix characters or other data symbols. In other words, as seen in FIG. 3, the deposition of print drops 27 based solely on vertical deflection by vertical deflector 35 and relative horizontal motion of print head of FIG. 2 would occur at the coordinate intercepts (i.e.; points of intersection) of lines 1–15 and I–XII. As previously stated, this invention provides means for depositing drops at positions intermediate the coordinate intercepts of a rectilinear matrix pattern, i.e. intermediate the points of intersection of coordinate lines 1–15 and I–XII. To accomplish this, certain of the print drops are deflected additional fractional amounts, either vertically or horizontally or both, relative to the amount they would be deflected by the vertical scan deflector 35 and horizontal displacement of the moving print head.

Figure 8:
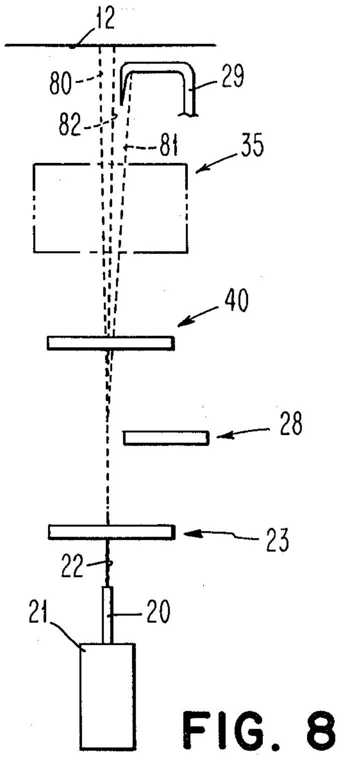
FIG. 8 is a plan view schematic of the ink jet printer apparatus of FIG. 2.

In the preferred embodiment, a fractional vertical magnetic deflector 40 is located adjacent the drop stream between selector 28 and raster scan deflector 35. As seen in FIG. 2, the fractional vertical magnetic deflector 40 comprises a C-shaped magnetic core 41 and a winding 42 connected to a pulse signal source. The drop stream passes adjacent to a gap 43 which produces a gradient magnetic field when winding 42 is energized with a fractional deflection pulse. The width of the magnetic core 41 is less than the spacing between drops and the duration of a pulse is timed so that only a single drop at a time is fractionally deflected upward toward the gap 43. A second fractional selector for fractional horizontal deflection structured the same as selector 40 could also be used. However, in the preferred embodiment of this invention, the selector 28 is used for fractional horizontal deflection as well as deflection for removal of unwanted drops. This is accomplished by applying horizontal deflection signal pulses of different amplitudes to coil 31 in timed relation with presence of individual drops 22 adjacent to gap 32. For fractional horizontal deflection, relatively low amplitude pulses are applied to coil 31 while for drop removal deflection to catcher 29, the relatively higher or highest amplitude pulse would occur on coil 31. As seen in FIG. 8, the fractional horizontal deflection pulse applied to selector 28 causes selected print drops to follow a third trajectory 82 between the initial trajectory 80 and the trajectory 81 of unwanted drops.

Figure 6:
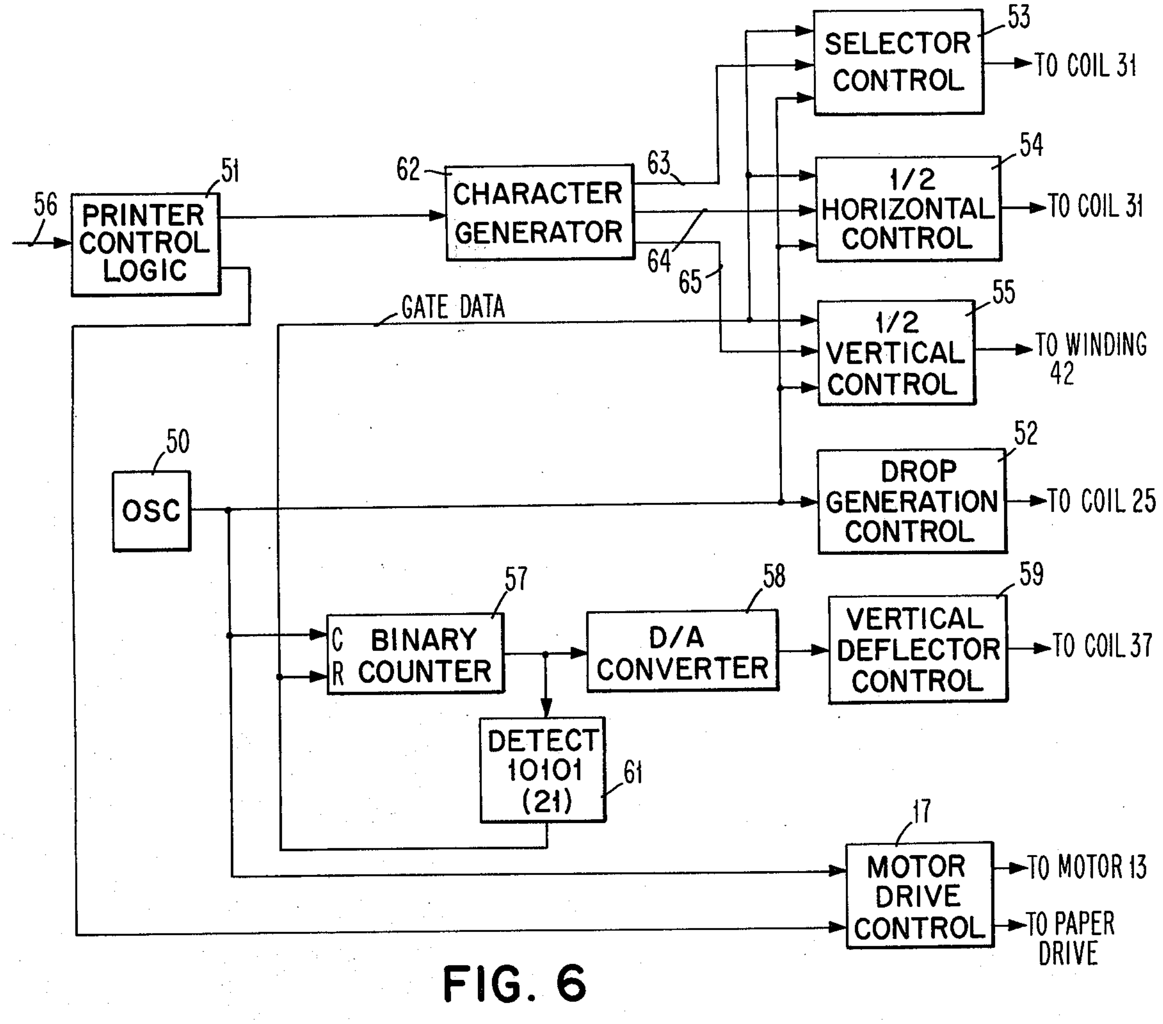
FIG. 6 is a circuit diagram for operating the deflection system of FIG. 2.

A control circuit for printing characters on paper 12, as seen in FIG. 6, comprises an oscillator 50 for timing the various deflections by the apparatus of FIGS. 1 and 2 and the drive controls 17 for the motors that index the paper and move the print head assembly 10 relative to paper 12 and a printer control logic 51 which initiates the print cycle and controls the character selection for printing. Oscillator 50 is a free-running oscillator of any known type designed to deliver timing pulses at a constant frequency rate. The output of oscillator 50 is connected to a drop generation control 52, a selector control 53 and the fractional deflection controls specifically identified for descriptive purposes as the one-half horizontal control 54 and one-half vertical control 55. The output of oscillator 50 is also connected to motor drive control 56 and a binary counter 57. The output from binary counter 57 is connected to a D/A converter 58 which is connected to the vertical deflector control 59 whose output is connected to coil 37 of vertical scan deflector 35. A detect 10101 circuit 61 is connected to the output and the R input of binary counter 57 in order to reset the counter at a count of 21 (the number of drop cycles required per raster for the arrangement shown in FIG. 4). The output of the detect 10101 circuit 61 is connected to apply a GATE DATA pulse to selector control 53, the one-half horizontal control 54 and the one-half vertical control 55 to transfer and store print data to control one complete raster scan. A character generator 62 operated by the printer control logic 51 has separate outputs 63, 64, 65, respectively, connected to the selector control 53, one-half horizontal control 54 and one-half vertical control 55. Character selection is made by a coded signal on line 56 from external data processor or the like to printer control logic 51 which in turn sends a coded signal to the character generator 62. The character generator 62 is essentially a read only storage device or the like which stores in binary form all the pulse patterns for each scan of all the characters in order to operate the various deflectors and selector for removing and deflecting drops prior to their deflection by the vertical scan deflector 35.

Figure 7:
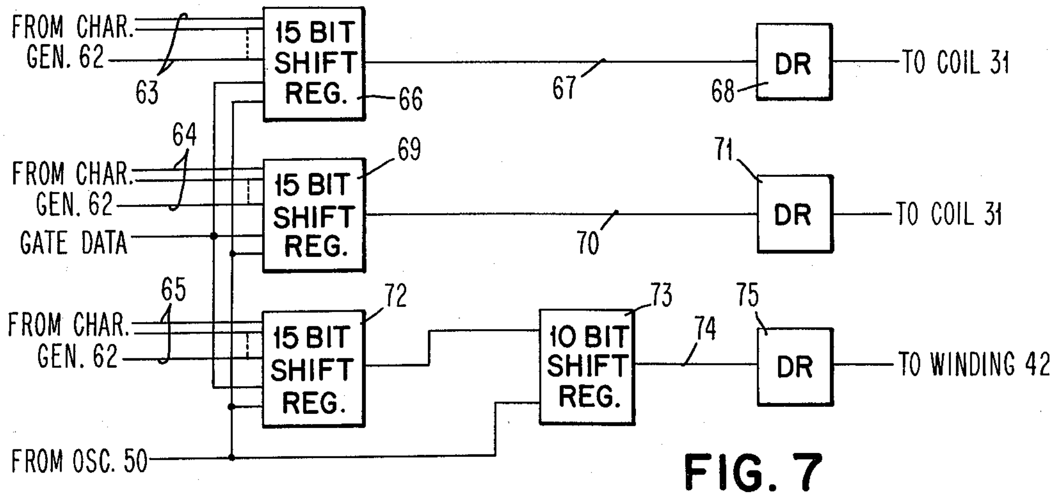
FIG. 7 is a detail circuit diagram of a portion of the deflection control circuits of FIG. 6.

As seen in FIG. 7, for a 12 x 15 matrix pattern illustrated in FIG. 3, selector control 53 comprises a 15 bit shift register 66 and a pulse driver circuit 68 connected to coil 31 of selector 28. The one-half horizontal control 54 comprises a similar 15 bit register 69 and a pulse driver 71 also connected to coil 31 of selector 28. In the embodiment described where the selector 28 is operated both to deflect unwanted drops 27, as well as to produce one-half horizontal drop deflection of print drops, drivers 68 and 71 produce pulses having different amplitudes since the amount of deflections for removing a drop is greater than the amount of deflection required to provide a horizontal fractional deflection of a print drop. Likewise, the one-half vertical control 55 comprises a 15 bit shift register 72 connected to a 10 bit shift register 73 and pulse driver 75 whose output is connected to winding 42 of the one-half vertical deflector 40.

On signal from the printer control 51 the bit pulse pattern for one vertical stroke of the designated character to be recorded on paper 12 is applied on lines 63, 64 and 65 with a GATE DATA signal from detect 10101 circuit 61 applied to shift registers 66, 69 and 72. Pulses from the oscillator 50 advance the sequence of pulses through the shift registers 66, 69, 72 and 73, and out serially to drivers 68, 71 and 75. Bits present on the output lines 67, 70 and 74 of the shift registers 66, 69 and 72 cause drivers 68, 71 and 75 to be turned on for a corresponding time period to deflect the appropriate drop either horizontally or vertically the desired fractional amounts or to remove the unwanted drop. The process is repeated for each scan until a complete character is printed.

Figure 4:
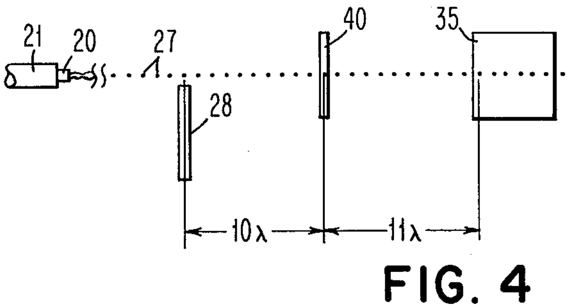
FIG. 4 shows in schematic detail the spacing relationship of the operating elements of the print head of FIG. 2.
Figure 5:
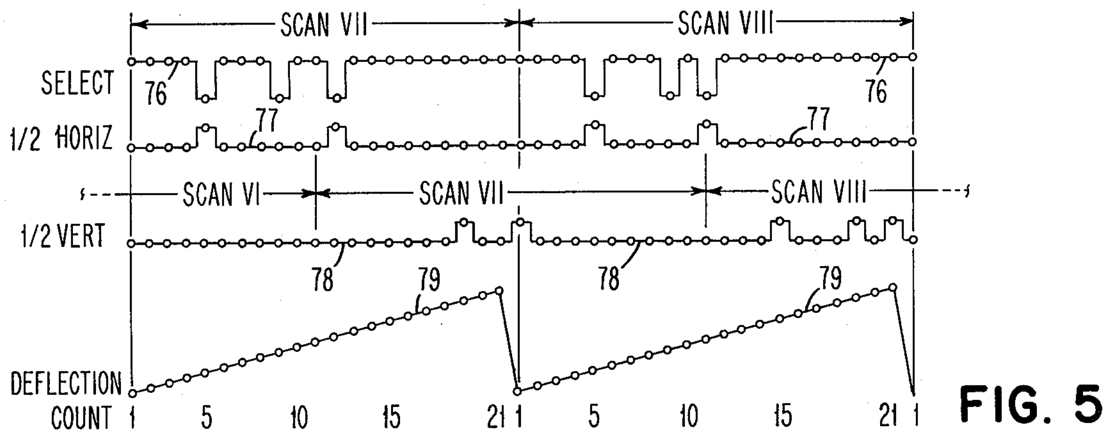
FIG. 5 is a timing chart explaining the operation of the deflection elements of FIG. 2 for the spatial relationship of FIG. 4.

This can be more clearly understood by reference to FIGS. 3, 4 and 5. Considering the pulse sequence shown in scan VII, as seen in FIG. 3, the matrix positions VII-1, VII-2, VII-3 and VII-4 have no dots to be recorded for the character *e*. Thus, driver 68 is turned on for the first four time periods $T_1$-$T_4$ of a character scan, as shown by curve 76 in FIG. 5. At time $T_5$ driver 68 is turned off. However, a bit at the output line 70 of shift register 69 turns on driver 71, as shown by the curves 76 and 77 in FIG. 5. This driver pulser from driver 71 is a lower amplitude pulse, as previously mentioned, than the pulse from driver 68 so that the drop in position at selector 28 (see FIG. 4) is deflected horizontally with sufficient amplitude for flight along trajectory 82 (see FIG. 8) ultimate deposition midway between the matrix coordinates VII-5 and VIII-5, as shown by dot 80 in FIG. 5. For scan times $T_6$-$T_8$ driver 68 is again turned on to energize selector 28 to deflect a succeeding three drops for removal from printing. At $T_9$ driver 68 is turned off. The drop to form dot 81 in FIG. 3 is then present at selector 28 which, as shown in FIG. 4, is 10 dots or 10 time intervals from the fractional vertical deflector 40. At that time the vertical half pulse deflect for the drop is shifted into 10 bit shift register 73 but has not produced an output through gate 74 to turn on driver 75. At times $T_{10}$ and $R_{11}$ the selector driver 68 is turned on and turned off at $T_{12}$. Since dot 82 in FIG. 3 is to be deflected both horizontally and vertically from coordinate position VII-12, driver 71 is turned on at $T_{12}$ to produce a one-half horizontal deflection of the drop then present at selector 28 (see FIG. 4).

Since fractional vertical deflector 40 is spaced 10 drops downstream from selector 48, as shown in FIG. 4, the bits from character generator 62 for the one-half vertical deflector are first shifted from the 15 bit shift register 72 to the 10 bit shift register 73. This introduces a time delay corresponding to the 10λ separation between fractional vertical deflector 40 and selector 28. Thus, the one-half vertical deflection driver 75 is turned off and on 10 time intervals later than the selector 28 and the one-half horizontal select driver 54 to correspond with the spatial separation. Therefore, as shown by curve 78 in FIG. 5, the first one-half vertical deflect pulse from driver 75 for the drop to occur as dot 81 in FIG. 3 between coordinate intercepts VII-9 and VII-10 is turned on at $T_{19}$. Thus, at $T_{19}$ the drop in position at fractional vertical deflector 40 will be deflected one-half increment upward so that when vertically deflected by vertical scan signal of curve 79 in FIG. 5 the dot 81 will occur displaced from coordinate intercept position VII-9. Also, at time $T_1$ of the second raster scan cycle, drivers 75 will again be turned on for a single time period to provide a one-half fractional vertical deflection to the drop which was earlier deflected one-half horizontally by selector 28 when energized by driver 71. Thus, the drop which is deflected by the sawtooth scan pulse of curve 79 by vertical deflector 35 to become dot 82 will have been deflected bidirectionally from coordinate intercept location VII-12 to a horizontally and vertically displaced fractional location.

The same sequence of operation occurs for each of the strokes of the character until all dots have been removed and deflected to their appropriate coordinate intercepts or positions intermediate the matrix intercepts. In the specific operation for the circuit of FIGS. 6 and 7 for an arrangement shown in FIG. 4, the timing of signals supplied to the various deflection components are derived from the binary counter 57 and must take into account the spatial relationships of these various components. The output of the counter 57 is used directly to provide inputs to a digital-to-analog converter 58 in the customary weighted fashion so that the analog output is proportional to the count. The counter 57 is reset to a count of 1 after each time it has reached a count of 21, which is equal to the number of drops needed per raster scan for the matrix shown in FIG. 3. Hence, the digital-to-analog converter output is a linearly increasing signal starting at 1 and resetting at 21, as shown by curve 79 in FIG. 5. The drop that enters the deflector 35 when the counter is at 1 and the succeeding 14 drops are useful for printing, but the drop entering at a count of 16 and the succeeding 5 drops comprise the fly-back drops and are not useful for printing since they are within the deflector field during the reset of the deflector drive ramp by detect 21 circuit 61. The data pulses supplied to the selector coil 31 must be timed properly so that the drops selected for printing are taken from these first fifteen drops and the drops 16 through 21 are discarded. Since the selector 28 is located 21 drop spaces before the deflector 35 entrance, the first printable drop is adjacent to the selector 28 when the counter output is at a count of 1. (Note that the drops entering the deflector 35 are those that have been operated on by the selector 28 twenty-one counts or one raster scan cycle previously.) The data for control of selection and for one-half horizontal and one-half vertical control is loaded into the shift registers 53, 54, 55 one count previous to count 1, that is count 21 (the final count of the previous raster scan cycle), for each raster scan cycle. Then the next 15 oscillator cycles, those occurring during counts 1 through 15, will provide the selection, and one-half horizontal, and one-half vertical control signals at the shift register output lines 67, 70 and 74 corresponding to the 15 printable drops. During the succeeding six oscillator cycles the selector output line is fixed to provide for a maximum drive signal to the selector 28 which results in discarding these drops. The output of the vertical one-half shift register 72 is delayed by a count of 10 by passing the data through a 10-position shift register 73 in order to account for the spatial position of the vertical one-half component 10 drop spaces downstream of the selector 28.

Upon completion of the printing of a character the selector 28 is retained in energized condition to remove all of the drops generated during the time of traverse of the print head assembly to print the successive character whereupon the print control logic 51 again, on instruction from an external data source, addresses the character generator 62 to apply the bit pulse sequences of the first scan position of the character matrix, as shown in FIG. 3, followed by all succeeding scans of the character matrix. Upon completion of an entire line of print the printer control logic 51 on command from external data source indicates to motor drive control 56 to decelerate and stop the print head assembly 10 at the end of line position and follows with a signal to the paper drive to advance the paper to the next print position. Upon completion of the print cycle, on signal from the external control the printer control logic 51 again initiates the motor drive control 56 to receive pulses from oscillator 30 to operate motor 13 and the printing of characters begins as previously described.

While a specific embodiment practicing this invention has been shown and described, the invention may take other forms. For example, other matrix patterns may be adopted depending on the size and style of character desired to be printed. Also, while this specific embodiment illustrates a fractional deflection control which is one-half the distance between matrix coordinate intercepts, other fractional amounts might be used. Also, while the invention is described in connection with the serial matrix printer, it is to be clearly understood that the invention could be adapted for use in a parallel or a series-parallel printer.

While the invention has been particularly shown and described with reference to a preferred embodiment thereof, it will be understood by those skilled in the art that various changes in form and details may be made therein without departing from the spirit and scope of the invention.

I claim:

1. A method of printing characters on a record medium with individual drops of ink comprising projecting a sequence of uniformly-spaced ink drops in a first direction toward said record medium while effecting relative motion between the record medium and said stream in a second direction orthogonal to said first direction, said drops in said sequence being at least equal in number to the number of coordinate intercepts of a predetermined rectilinear matrix pattern, and forming data markings on said record medium with said drops in accordance with a predetermined data pattern including selectively removing unwanted drops from said sequence to cause blanks at predetermined coordinate intercepts of said matrix pattern, deflecting the remaining drops from said sequence in a third direction orthogonally to said first and second directions so as to cause said remaining drops to be directed to impact predetermined intercept locations of said matrix pattern, and altering the deflection of certain of said remaining drops in either said second or third direction for causing said certain drops to be directed to locations intermediate coordinate intercepts of said matrix pattern.

2. Apparatus for printing data on a record medium with individual ink drops comprising means for projecting a sequence of uniformly-spaced ink drops in a first direction toward said record medium, said drops in said sequence being at least equal in number to the number of coordinate intercepts of a predetermined rectilinear matrix pattern, means for effecting relative motion between said record medium and said sequence of drops in a second direction orthogonal to said first direction, means for selectively removing unwanted drops from said sequence to cause blanks at predetermined coordinate intercepts of said matrix pattern, means for deflecting the remaining drops of said sequence in a third direction orthogonally to said first and second directions so as to cause said remaining drops to be directed to impact predetermined intercept locations of said matrix pattern, and means for altering the deflection of certain of said remaining drops in either said second or third directions for causing said certain drops to be directed to locations intermediate the coordinate intercepts of said matrix pattern.

3. Apparatus for printing data on a record medium with individual ink drops comprising means for projecting a sequence of uniformly-spaced ink drops in a straight line trajectory perpendicular to said record medium, said drops in said sequence being at least equal in number to the number of coordinate intercepts of a predetermined rectilinear matrix pattern;

means for effecting relative motion of said record medium and said projecting means in a horizontal direction;

means for selectively removing unwanted drops from said sequence to cause blanks at predetermined coordinate intercepts of said matrix pattern including drop catcher means proximate said record medium and offset from the trajectory of said ink drops, and means for deflecting unwanted drops in a second trajectory towards said drop catcher means;

means for deflecting the remaining drops of said sequence vertically to cause said remaining drops to be directed to impact predetermined intercept locations of said matrix pattern, and means for further deflecting certain of said remaining drops either horizontally or vertically causing said certain drops to be redirected to locations intermediate the coordinate intercepts of said matrix pattern.

4. Apparatus for printing data on a record medium in accordance with claim 3 in which said ink drops are formed of field controllable fluid, said means for selectively removing unwanted drops comprises field transducer means for directing unwanted drops towards a catcher means, said means for deflecting the remaining drops comprises a field transducer operable to generate a vertical scanning field, and said means for altering the deflection of certain of said remaining drops comprises transducer means for generating a deflection field either vertically or horizontally predetermined fractional amounts for causing said certain drops to be redirected to locations intermediate the coordinate intercepts of said matrix pattern.

5. Apparatus for printing data on a record medium in accordance with claim 4 in which said ink drops are magnetic ink drops, and said transducers for selectively removing unwanted drops, deflecting the remaining drops, and for altering the deflection of certain of the remaining drops all comprise magnetic field transducers located along the trajectory of said magnetic ink drops.

6. Apparatus for printing data on a record medium in accordance with claim 5 in which said magnetic transducer means for altering the deflection of said remaining magnetic ink drops comprises a first magnetic transducer for deflecting certain of said remaining drops a fractional amount in a vertical direction, and a second magnetic transducer spaced from said first magnetic transducer for deflecting said magnetic ink drops a fractional amount horizontally relative to the trajectory of said ink drops, and means for selectively energizing said first and second magnetic transducers for deflecting certain of the remaining drops in either said vertical or horizontal direction for causing said certain drops to be directed to locations horizontally or vertically intermediate the coordinate intercepts of said matrix pattern.

7. Apparatus for printing data on a record medium in accordance with claim 6 in which said means for selectively removing unwanted drops and for altering the deflecting of certain remaining drops in a horizontal direction comprises a single transducer element located adjacent the trajectory of said ink drops, and means for operating said transducer element selectively at different levels to direct said unwanted drops toward said drop catcher or to a horizontal location intermediate the coordinate intercepts of said matrix pattern.

* * * * *